3,450,739
BIS(DIORGANO-ALKOXYSILYL) NEOCARBORANES
Theodore L. Heying, North Haven, and Stelvio Papetti, Hamden, Conn., assignors to Olin Mathieson Chemical Corporation, a corporation of Virginia
Continuation-in-part of application Ser. No. 361,409, Apr. 21, 1964. This application Sept. 28, 1967, Ser. No. 671,266
Int. Cl. C07f 7/12, 5/02, 7/08
U.S. Cl. 260—448.8        13 Claims

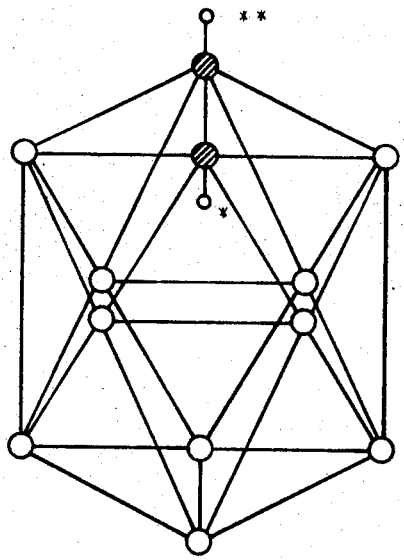
FORMULA - I
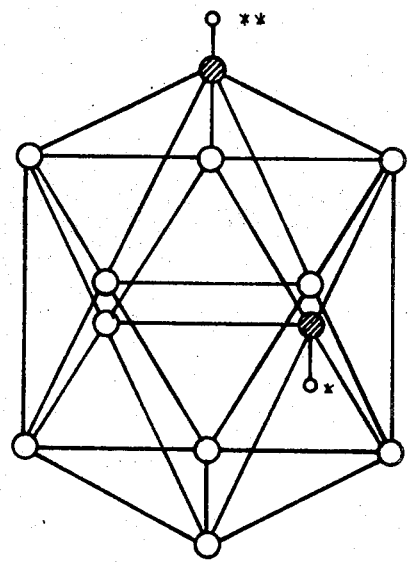
FORMULA - II
○ BORON
◉ CARBON
ο HYDROGEN ON CARBON
(HYDROGEN ATOMS ON BORON
OMITTED FOR CLARITY)
INVENTORS.
THEODORE L. HEYING
STELVIO PAPETTI
BY  *Walter O. Hunter*
AGENT United States Patent Office 3,450,739
Patented June 17, 1969

ABSTRACT OF THE DISCLOSURE

Silicon-containing organoboranes are prepared by reacting a compound of the formula:

$$X-\underset{\underset{R''}{|}}{\overset{\overset{R''}{|}}{Si}}-CB_{10}H_8RR'C-\underset{\underset{R''}{|}}{\overset{\overset{R''}{|}}{Si}}-X$$

wherein R, R' are hydrogen or alkyl, R'' is alkyl or aryl and X is a halogen selected from the group consisting of chlorine, bromine and iodine, with a stoichiometric excess of an alcohol of the formula:

$$R'''OH$$

wherein R''' is an alkyl radical of from 1 to 6 carbon atoms. The alkoxy-substituted neocarborane derivatives can be utilized to prepare polymeric condensation products which have a high degree of inertness to solvent action and have high softening points.

This application is a continuation-in-part of application Ser. No. 361,409, filed Apr. 21, 1964, now abandoned.

This invention relates to silicon-containing organoboranes and to a method for their preparation.

The novel silicon-containing organoboranes of this invention have the formula:

$$R'''-O-\underset{\underset{R''}{|}}{\overset{\overset{R''}{|}}{Si}}-CB_{10}H_8RR'C-\underset{\underset{R''}{|}}{\overset{\overset{R''}{|}}{Si}}-O-R'''$$

wherein R and R' are each selected from the group consisting of hydrogen and alkyl of from 1 to 5 carbon atoms, R'' is alkyl of from 1 to 12 carbon atoms or aryl of not more than 8 carbon atoms, and R''' is alkyl of from 1 to 6 carbon atoms. The radical —CB$_{10}$H$_8$RR'C— is derived from the meta isomer of carborane (i.e., neocarborane) of the formula:

$$HCB_{10}H_8RR'CH$$

The structure of neocarborane, which has the formula:

$$HCB_{10}H_{10}CH$$

is shown as structural Formula II in the drawing.

The silicon-containing organoboranes of this invention are prepared by reacting a halogen-substituted silicon-containing organoborane compound of the formula:

$$X-\underset{\underset{R''}{|}}{\overset{\overset{R''}{|}}{Si}}-CB_{10}H_8RR'C-\underset{\underset{R''}{|}}{\overset{\overset{R''}{|}}{Si}}-X \quad (I)$$

wherein R, R' and R'' have the same meaning as previously described and X is a halogen selected from the group consisting of chlorine, bromine and iodine, with a stoichiometric excess of an alcohol of the formula:

$$R'''OH$$

wherein R''' is an alkyl radical of from 1 to 6 carbon atoms.

Alcohols useful as starting materials in this process include, for example, methyl, ethyl, n-propyl, isopropyl, n-butyl, isobutyl, n-amyl, isoamyl, n-hexyl and isohexyl. In carrying out the process of this invention a stoichiometric excess of the alcohol is employed. Generally from about 2.5 to about 250 moles or more of alcohol is employed per mole of the halogen-substituted silicon-containing organoborane charged to the reactor.

Halogen-substituted, silicon-containing organoboranes suitable as starting materials in the process of this invention include bis(chlorodimethylsilyl) neocarborane, bis(chlorodimethylsilyl) methyl neocarborane, bis(chlorodiethylsilyl) ethyl neocarborane, bis(chlorodi-n-propylsilyl) neocarborane, bis(chlorodiisopropylsilyl) dimethyl neocarborane, bis(chlorodiisopropylsilyl) diethyl neocarborane, bis(chlorodi-n-butylsilyl) neocarborane, bis(chlorodiisobutylsilyl) n-butyl neocarborane, bis(chlorodiisoamylsilyl) neocarborane, bis(chlorodi-n-hexylsilyl) neocarborane, bis(chlorodiisoheptylsilyl) isoamyl neocarborane, bis(chlorodi-n-octylsilyl) neocarborane, bis(chlorodiisodecylsilyl) neocarborane, bis(chlorodi-n-dodecylsilyl) methyl neocarborane, bis(chlorodiphenylsilyl) neocarborane, bis(chlorodiethylphenylsilyl) neocarborane, bis(chloroditolylsilyl) diethyl neocarborane, bis(chlorodixylylsilyl) neocarborane, etc. and the corresponding bromine and iodine derivatives. These useful halogen-substituted silicon-containing organoboranes can be prepared by the method set forth in Papetti application Ser. No. 310,379, filed Sept. 20, 1963, for Compound and Process now U.S. Patent 3,366,656. For example, the compound bis(chlorodimethylsilyl) neocarborane can be prepared by making, in a first step, dilithioneocarborane from neocarborane and butyl lithium and, in a second step, reacting the thus-prepared dilithioneocarborane with dichlorodimethylsilane.

When organoboranes (i.e., carboranes) of the class:

$$RR'B_{10}H_8[C(H)C(H)]$$

wherein R and R' are each selected from the group consisting of hydrogen and an alkyl radical containing from 1 to 5 carbon atoms are heated to a temperature of above 400° C. a thermal isomerization takes place and the so-called neocarboranes are formed. For example, the compound carborane (B$_{10}$H$_{10}$[C(H)C(H)]) can be converted to neocarborane by heating in a sealed tube at a temperature of about 475° C. for 5 to 20 hours. The structural formula of the compound carborane is shown as structural Formula I in the drawing while the structural formula of the compound neocarborane is shown as structural Formula II in the drawing.

The reaction temperature can be varied widely from about —10° C. up to about 175° C. and preferably will be from about 0° C. to about 125° C. Usually the reaction will be completed in from about 0.05 to about 4 hours or more depending upon the particular reaction conditions employed. Although the reaction is ordinarily carried out at atmospheric pressure, if desired, pressures ranging from subatmospheric up to about +5 atmospheres or more can be utilized.

The excess alcohol employed serves as the reaction medium in which the process of this invention is carried out. Where the solubility of the halogen-substituted, silicon-containing organoborane starting material or the corresponding product in the alcohol is low, it is sometimes desirable to employ an inert solvent in addition to the excess alcohol. Preferably the solvents are alcohol miscible and they can be polar or nonpolar materials, for example, aliphatic and aromatic hydrocarbons, such as benzene, toluene, xylene, etc.; ketones such as acetone, methylethylketone, etc. and the dialkyl ethers such as diethyl ether, diisopropyl ether, etc.

The products of this invention can be recovered from the reaction mixture in a variety of ways. For example, the reaction mixture can be evaporated to dryness and the product recovered by distillation, recrystallization from a solvent such as methyl alcohol, ethyl alcohol, pentane, hexane, heptane, etc., or by extraction followed by distillation.

The following examples illustrate this invention and are to be considered not limitative.

EXAMPLE I

A total of 7.16 gr. (0.0235 mole) of bis(chlorodimethylsilyl) neocarborane was dissolved in 30 ml. of methanol. The solution was stirred at room temperature for 3 hours and then evaporated to dryness. In the next step residue was distilled under reduced pressure. The product bis(methoxydimethylsilyl) neocarborane, was recovered in 91 percent yield based on the theoretical quantity, B.P. 102–4° C. (0.05 mm. Hg). On standing, the compound solidified, M.P. 36–7° C.

The product was analyzed for carbon, hydrogen and boron and the following results were obtained:

Calc'd for $C_8H_{28}B_{20}O_2Si_2$: C, 29.96; H, 8.80; B, 33.76. Found: C, 29.72; H, 8.93; B, 33.79.

The structural formula of the compound bis(methoxydimethylsilyl) neocarborane is the same as structural Formula II in the drawing except that the hydrogen atoms designated by the single and double asterisks are each replaced by the radical:

$$CH_3O-\underset{\underset{CH_3}{|}}{\overset{\overset{CH_3}{|}}{Si}}-$$

EXAMPLE II

A total of 76.3 gr. (0.231 mole) of bis(chlorodimethylsilyl) neocarborane was dissolved in 300 ml. of methanol. The solution was stirred at room temperature for 3 hours. After 2½ hours a crystalline material separated out was removed by filtration. The filtrate was concentrated several times yielding in each operation a crop of crystals which were recovered by filtration. All these portions were dried under vacuum at room temperature and were found to be bis(methoxydimethylsilyl) neocarborane (M.P. 36–7° C.). The yield was 93.5 percent of the theoretical quantity.

The combined product was analyzed for carbon, hydrogen, boron and silicon and the following results were obtained:

Calc'd for $C_8H_{28}B_{20}O_2Si_2$: C, 29.96; H, 8.80; B, 33.74; Si, 17.52. Found: C, 29.81; H, 8.80; B, 33.94; Si, 17.90.

EXAMPLE III

A total of 28.1 gr. (0.0486 mole) of bis(chlorodiphenylsilyl) neocarborane was placed in 250 ml. of methanol and 150 ml. of ether was then added to obtain a solution. After the solution had been refluxed for 45 minutes it was taken to dryness. Recrystallization of the solid thus obtained gave bis(methoxydiphenylsilyl) neocarborane (M.P. 151–3° C.) in 76 percent yield.

The product was analyzed for carbon, hydrogen, boron and silicon and the following results were obtained:

Calc'd for $C_{28}H_{36}B_{10}O_2Si_2$: C, 59.11; H, 6.38; B, 19.02; Si, 9.87. Found: C, 58.73; H, 6.60; B, 19.48; Si, 9.58.

The structural formula of the compound bis(methoxydiphenylsilyl) neocarborane is the same as structural Formula II in the drawing, except that the hydrogen atoms designated by the single and double asterisks are each replaced by the radical:

$$CH_3O-\underset{\underset{\bigcirc}{|}}{\overset{\overset{\bigcirc}{|}}{Si}}-$$

EXAMPLE IV

A total of 3.0 g. (0.006 mole) of bis(chlorodibutylsilyl) neocarborane was treated with 20 ml. of absolute methyl alcohol at room temperature. In the next step, after sufficient ethyl ether had been added to give a clear solution, the reaction mixture was stirred at room temperature for 2 hours. The solution was then evaporated to dryness and the residue distilled under reduced pressure at 0.05 mm. Hg and at a temperature of 200–210° C. to yield bis(methoxydibutylsilyl) neocarborane.

The product was analyzed for carbon, hydrogen, boron and silicon and the following results were obtained:

Calc'd for $C_{20}H_{52}B_{10}O_2Si_2$: C, 49.10; H, 10.72; B, 22.13; Si, 11.49. Found: C, 48.47; H, 10.79; B, 21.71; Si, 11.14.

The structural formula of the compound bis(methoxydibutylsilyl) neocarborane is the same as the structural Formula II in the drawing, except that the hydrogen atoms designated by the single and double asterisks are each replaced by the radical:

$$CH_3O-\underset{\underset{C_4H_9}{|}}{\overset{\overset{C_4H_9}{|}}{Si}}-$$

EXAMPLE V

A total of 10.0 gr. (0.01577 mole) of bis(chloroditolylsilyl) neocarborane is dissolved in 35 ml. of ethanol. The solution is stirred at room temperature for 4 hours and then evaporated to dryness. Finally, the residue is distilled under reduced pressure. The product, bis(ethoxyditolylsilyl) neocarborane, is recovered in about 90 percent yield based on the theoretical quantity.

The structural formula of the compound bis(ethoxyditolylsilyl) neocarborane is the same as structural Formula II in the drawing except that the hydrogen atoms designated by the single and double asterisks are each replaced by the radical:

$$C_2H_5O-\underset{\underset{\bigcirc-CH_3}{|}}{\overset{\overset{\bigcirc-CH_3}{|}}{Si}}-$$

The silicon-containing organoboranes of this invention can be employed as described in Heying, Papetti and Schaffling application Ser. No. 361,408, filed Apr. 21, 1964, now U.S. Patent 3,388,090 in the preparation of linear polymeric condensation products which exhibit a high degree of inertness to solvent action and have high softening points. These polymers, when compounded with inert fillers and a curing catalyst, can be cured to yield compositions which are suitable for the fabrication of bushings and gaskets useful in high temperature and high pressure applications. For example, a linear polymeric condensation product can be prepared by heating together equimolar quantities of bis(methoxydimethylsilyl) neocarborane and bis(chlorodimethylsilyl) neocarborane in the presence of ferric chloride at a temperature of from about 150° C. to about 225° C.

What is claimed is:

1. A method for the preparation of silicon-containing organoboranes which comprises reacting a compound of the formula:

$$X-\underset{\underset{R''}{|}}{\overset{\overset{R''}{|}}{Si}}-CB_{10}H_8RR'C-\underset{\underset{R''}{|}}{\overset{\overset{R''}{|}}{Si}}-X$$

wherein R and R' are each selected from the group consisting of hydrogen and alkyl of from 1 to 5 carbon atoms, R'' is selected from the group consisting of alkyl of from 1 to 12 carbon atoms and aryl of not more than 8 carbon atoms, and X is a halogen selected from the group consisting of chlorine, bromine and iodine, with a stoichiometric excess of an alcohol of the formula:

R'''OH wherein R''' is alkyl of from 1 to 6 carbon atoms.

2. The method of claim 1 wherein the temperature of the reaction is from about −10° C. to about 175° C.

3. The method of claim 1 wherein the said compound is bis(chlorodimethylsilyl) neocarborane.

4. The method of claim 1 wherein the said compound is bis(chlorodiphenylsilyl) neocarborane.

5. The method of claim 1 wherein the said compound is bis(chlorodibutylsilyl) neocarborane.

6. The method of claim 1 wherein the said alcohol is methanol.

7. The method of claim 1 wherein the said compound is bis(chlorodimethylsilyl) neocarborane, the said alcohol is methanol, and the reaction is carried out at a temperature of from about −10° C. to about 175° C.

8. The method of claim 1 wherein the said compound is bis(chlorodiphenylsilyl) neocarborane, the said alcohol is methanol, and the reaction is carried out at a temperature of from about −10° C. to about 175° C.

9. The method of claim 1 wherein the said compound is bis(chlorodibutylsilyl) neocarborane, the said alcohol is methyl alcohol and the reaction is carried out at a temperature of from about −10° C. to about 175° C.

10. Silicon-containing organoboranes of the formula:

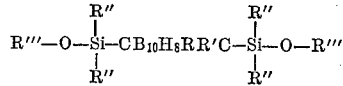

wherein R and R' are each selected from the group consisting of hydrogen and alkyl of from 1 to 5 carbon atoms, R'' is selected from the group consisting of alkyl of 1 to 12 carbon atoms, and aryl of not more than 8 carbon atoms, and R''' is alkyl of from 1 to 6 carbon atoms.

11. Bis(methoxydimethylsilyl) neocarborane.
12. Bis(methoxydiphenylsilyl) neocarborane.
13. Bis(methoxydibutylsilyl) neocarborane.

References Cited

UNITED STATES PATENTS 3,321,505   5/1967   Fein et al. _____ 260—448.8

TOBIAS E. LEVOW, *Primary Examiner.*

P. F. SHAVER, *Assistant Examiner.*

U.S. Cl. X.R.

260—37, 46.5